(12) United States Patent
Ryan

(10) Patent No.: US 12,552,066 B2
(45) Date of Patent: Feb. 17, 2026

(54) CUTTING APPARATUS WITH MULTI-DIRECTIONAL CUTTING ELEMENT

(71) Applicant: Michael P. Ryan, Katy, TX (US)

(72) Inventor: Michael P. Ryan, Katy, TX (US)

( * ) Notice: Subject to any disclaimer, the term of this patent is extended or adjusted under 35 U.S.C. 154(b) by 1146 days.

(21) Appl. No.: 16/071,304

(22) PCT Filed: Jan. 19, 2017

(86) PCT No.: PCT/US2017/014093
§ 371 (c)(1),
(2) Date: Jul. 19, 2018

(87) PCT Pub. No.: WO2017/127517
PCT Pub. Date: Jul. 27, 2017

(65) Prior Publication Data
US 2021/0206018 A1  Jul. 8, 2021

Related U.S. Application Data

(60) Provisional application No. 62/280,841, filed on Jan. 20, 2016.

(51) Int. Cl.
*B27B 33/14* (2006.01)
*B23D 61/02* (2006.01)
*B23D 61/12* (2006.01)

(52) U.S. Cl.
CPC .......... *B27B 33/145* (2013.01); *B23D 61/021* (2013.01); *B23D 61/121* (2013.01)

(58) Field of Classification Search
CPC ....... B27B 33/00; B27B 33/14; B27B 33/141; B27B 33/142; B27B 33/145; B27B 33/144; B23D 61/026; B23D 57/02; B23D 57/023; B23D 1/08; B23D 1/082; B23D 1/084; B23D 1/088; B23D 1/124; B23D 1/125; B23D 61/021; B28D 1/08; B28D 1/084; B28D 1/088
USPC .......................................................... D8/65
See application file for complete search history.

(56) References Cited

U.S. PATENT DOCUMENTS

| | | | | |
|---|---|---|---|---|
| 1,339,091 A * | 5/1920 | Benefiel | ................. | B27B 33/144 83/831 |
| 2,165,524 A * | 7/1939 | Wolf | ....................... | B27B 17/08 30/387 |
| 2,755,828 A * | 7/1956 | Dunnington | .......... | B27B 33/142 83/833 |
| 2,912,968 A * | 11/1959 | Stihl | ...................... | B28D 1/125 125/21 |
| 2,928,440 A * | 3/1960 | Fors | ....................... | B27B 33/142 83/834 |
| 3,346,025 A * | 10/1967 | Anderson | ............. | B27B 33/142 83/850 |

(Continued)

*Primary Examiner* — Adam J Eiseman
*Assistant Examiner* — Samuel A Davies
(74) *Attorney, Agent, or Firm* — Kearney, McWilliams & Davis, PLLC; William Yarbrough

(57) ABSTRACT

The present invention relates to a novel cutting apparatus capable of effectively cutting a material via movement in at least two different directions. In certain embodiments, the cutting apparatus comprises cutting elements with at least two cutting surfaces. Such cutting elements are capable of effectively penetrating a material when moved with an applied force in the direction that at least one cutting surface is oriented. Such cutting elements may be configured for use with a variety of cutting apparatus, including but not limited to chainsaws.

16 Claims, 17 Drawing Sheets

(56) References Cited

U.S. PATENT DOCUMENTS

| | | | | | |
|---|---|---|---|---|---|
| 3,945,288 | A * | 3/1976 | Olmr | B27B 33/141 | 83/834 |
| 3,999,294 | A * | 12/1976 | Shoben | B23D 57/023 | 30/166.3 |
| 4,074,604 | A * | 2/1978 | Goldblatt | B27B 33/141 | 83/834 |
| 4,348,927 | A * | 9/1982 | Olmr | B27B 33/141 | 83/834 |
| 4,750,395 | A * | 6/1988 | Doiron | B27B 33/141 | 83/834 |
| 5,184,598 | A * | 2/1993 | Bell | B27B 33/141 | 451/298 |
| 6,003,423 | A * | 12/1999 | Gerard | B27B 33/14 | 83/522.11 |
| 2003/0172787 | A1 * | 9/2003 | Wallace | B23D 57/02 | 83/102 |
| 2003/0192418 | A1 * | 10/2003 | Mang | B27B 33/141 | 83/834 |
| 2007/0169598 | A1 * | 7/2007 | Szymanski | B23D 61/06 | 83/13 |
| 2007/0169605 | A1 * | 7/2007 | Szymanski | B27B 33/144 | 83/834 |
| 2008/0264230 | A1 * | 10/2008 | Szymanski | B27B 33/144 | 83/831 |
| 2010/0005668 | A1 * | 1/2010 | Yancey | B23D 57/023 | 30/372 |
| 2013/0152760 | A1 * | 6/2013 | Canon | B27B 33/14 | 83/832 |
| 2013/0319201 | A1 * | 12/2013 | Schulz | B28D 1/124 | 83/830 |
| 2015/0273729 | A1 * | 10/2015 | Buchholtz | B27B 33/14 | 83/830 |
| 2017/0197327 | A1 * | 7/2017 | Harfst | B27B 33/141 | |
| 2020/0316811 | A1 * | 10/2020 | Hodgkinson | B27B 33/142 | |

* cited by examiner

Prior Art

CUTTING APPARATUS WITH MULTI-DIRECTIONAL CUTTING ELEMENT

CROSS-REFERENCE TO RELATED APPLICATION

This international (PCT) patent application claims the benefit of U.S. provisional patent application Ser. No. 62/280,841 filed on Jan. 20, 2016.

FEDERAL FUNDING LEGEND

This invention was not created using federal funds.

FIELD OF THE INVENTION

The present invention generally relates to a novel cutting apparatus. More specifically, the present invention relates to a novel cutting apparatus that provides for cutting by at least two different directions of movement.

BACKGROUND

Conventional cutting tools include, for example, saws for cutting tough materials. Of the many varieties of saws that are available, power-driven saws are often used because they are designed to provide more utility while requiring less human effort. Examples of power-driven saws include, but are not limited to, chainsaws, circular saws, and band saws. These types of saws are used by all sorts of individuals, both professionally and domestically, to assist with a variety of tasks including, for example, brush clearing, timber cutting, carpentry, as well as hobby-related activities.

A typical, conventional chainsaw may be powered by either a small internal combustion engine, such as a two-stroke, air-cooled engine or, in some cases, an electric motor. Usually, chainsaw motors include a shaft which drives a sprocket. The sprocket may be connected to the shaft via a clutch mechanism. An endless chain is driven by the sprocket within a channel along the outer perimeter of an elongate chainsaw bar. The endless chain commonly includes a plurality of links that include cutting elements as well as raker teeth, which control the depth of a given cut. The cutting elements and raker teeth of the chain project outwardly away from the bar, while sprocket drive links extend downwardly into the longitudinal channel or groove within the chainsaw bar. The cutting elements and raker teeth are interconnected by link arms via connecting mechanisms such as pins or rivets. The interconnectivity of these elements allows the chain to be continuously driven around the chainsaw bar due to the interaction of the sprocket drive links with the sprocket. The chain of a chainsaw is very important in that it significantly affects the overall effectiveness of the device. Problems arise with conventional saws when the chain's cutting elements become dull or damaged as the result of normal wear and tear or, perhaps, upon encountering a hard object such as a nail or a rock. In these and similar circumstances, the chain must be removed in order to sharpen the cutting surfaces of the cutting elements, or the chain must be replaced entirely with a new one. The new or repaired chain must then be reinstalled on the chainsaw bar. Oftentimes while performing these mandatory maintenance tasks, users, particularly less experienced users, reinstall the chain backwards so that the cutting elements will not cut effectively, if they cut at all. Additionally, the process of having to remove the chain, sharpen the cutting surfaces, and reinstall the chain or replace the chain requires substantial time and interruption of the task at hand, and makes the use of the chainsaw more cumbersome than necessary. Similar problems arise with other types of power-driven saws as the cutting elements on their blades become dull or damaged, requiring re-sharpening and/or replacement.

Some chainsaw chains have been designed with two sets of cutting elements that are oriented in two separate and generally opposing directions so that when one set of cutting elements wears out and/or gets damaged, the chain may be removed and reinstalled in the opposite orientation, thereby exposing the second set of cutting elements which were previously not in active cutting positions. Such an arrangement is still problematic in that each set of cutting elements comprises about half of the number of cutting elements of a regular chain, thereby forcing the chainsaw to require two revolutions to cut the same amount of material as it normally would with just one revolution meaning it has to work twice as hard or projects take twice as much time to complete.

Thus, there is a significant and long-standing need in the art for a cutting apparatus that is power-driven including but not limited to saws, for a longer period of time before maintenance tasks are required. Additionally, there is a significant and long-standing need in the art for such a cutting apparatus to maintain a relatively high efficiency of use and to comprise chains, blades or similar cutting means that are easier to replace, install or a combination thereof.

SUMMARY OF REPRESENTATIVE EMBODIMENTS OF THE INVENTION

In a preferred embodiment, the present invention is directed to a cutting apparatus, comprising a plurality of cutting elements, wherein each cutting element comprises a cutting element body, a cutting element tooth, or both, wherein the cutting elements are configured with at least two cutting surfaces oriented in at least two different directions, thereby allowing a single cutting apparatus to sufficiently penetrate a substance via moving in at least two different directions defined by the different directions of orientation of the cutting surfaces.

In another embodiment, the cutting apparatus further comprises at least one elongated element, wherein the elongated element allows attachment of more than one cutting elements to form a continuous chain of cutting elements, wherein the cutting element is arranged on the elongated element in a manner so that at least two cutting surfaces face substantially opposite directions, and wherein the cutting apparatus is configured to move in a substantially revolving motion to allow the cutting surfaces oriented in one direction to engage at a time in a cutting position.

In another related embodiment, each of the cutting elements is pivotally attached to a sprocket drive link as well as a connecting link arm to connect to an adjacent sprocket drive link and/or an adjacent cutting element, thereby creating a series of interconnected cutting elements and sprocket drive links along the elongated element.

In yet another related embodiment, the elongated element is removed from the cutting apparatus and reinstalled in the opposing orientation to engage the cuttings surfaces oriented in the opposing direction.

In further yet another related embodiment, the elongated element is adjusted between the first and second revolving directions by reversing the direction of applied force from a power source that drives the elongated element about the cutting apparatus or a portion thereof.

In yet another related embodiment, at least one sprocket link drive is designed to move in the direction in which the cutting surface is oriented, at least one sprocket link drive is designed to move in a direction opposite to the orientation of the cutting surface, or both.

In still yet another related embodiment, the cutting element comprises at least one raker tooth that converges distally from the cutting element body at a sharp tip end and faces toward the cutting element.

In another related embodiment, the cutting element body comprises at least one opening, wherein the opening allows one cutting element to be movably attached to another cutting element by means of an elongated element.

In yet another related embodiment, the cutting surface is curved or "U" shaped, wherein the cutting surface is a blade, edge, tooth, ridge, notch, groove or a combination thereof.

In still yet another related embodiment, the cutting tooth is a L-shaped protrusion that projects upwardly and outwardly from the cutting element body.

In further yet another related embodiment, the cutting surface is oriented in same direction or substantially opposite direction on opposing distal ends of the cutting element, cutting element body, cutting element tooth or a combination thereof.

In still further another related embodiment, the cutting elements can be moved by an internal combustion engine, an electrical motor, a human applied force or other power source, or a combination thereof.

In another related embodiment, the cutting apparatus comprises a plurality of cutting elements protruding from a single body, wherein the cutting element is a blade.

In yet another related embodiment, the body or the blade comprises an elongated or circular design.

In still yet another related embodiment, the cutting apparatus is a chainsaw, a circular saw, a band saw, jigsaws or tiger saws.

In further yet another related embodiment, the apparatus comprises at least two sets of cutting elements, wherein one set of cutting elements comprises cutting surfaces oriented in a first direction so as to be engaged when the apparatus moves in a first cutting direction against a material to be cut and wherein the second set of cutting elements comprises cutting surfaces oriented in a second direction so as to be engaged when the cutting apparatus moves in a second cutting direction against the material to be cut.

In another related embodiment, the apparatus comprises additional sets of cutting elements that comprise cutting surfaces oriented in additional directions.

In yet another related embodiment, the cutting apparatus comprises a single set of cutting elements with each cutting element comprising at least two cutting surfaces oriented in different directions.

In still yet another related embodiment, the cutting surfaces are oriented in opposing directions.

In another related embodiment, the cutting apparatus comprises anti-kickback feature wherein at least one anti-kickback connecting link moves in a direction in which the cutting surface is oriented to move, wherein at least one anti-kickback connecting link moves in a direction opposite to the orientation of the cutting surface or both.

In yet another related embodiment, the components of the cutting apparatus are held together by at least one rivet.

In still yet another related embodiment, the cutting element tooth comprises at least one steel cutting edge, at least one carbide cutting insert or both.

BRIEF DESCRIPTION OF THE DRAWINGS

FIG. 1A shows the schematic of the entire apparatus (compressed or collapsed version). FIG. 1B shows the components of the entire apparatus (exploded version). FIG. 1C shows the anti-kickback connecting link of the apparatus.

FIG. 2C shows ⅜" low profile, FIG. 2D shows semi-chisel, FIG. 2E shows round chisel and FIG. 2F shows square chisel.

DETAILED DESCRIPTION OF PREFERRED EMBODIMENTS

The present disclosure is directed to a cutting apparatus that is effective at penetrating a material or substance via multiple directions of movement. The embodiments of the present invention described herein provide various cutting apparatus that comprise a plurality of cutting elements. In this regard, the present invention discloses a cutting apparatus that includes cutting elements comprising at least two cutting surfaces oriented in at least two different directions so as to effectively cut through a material when the cutting elements travel in any direction in which a cutting surface is oriented.

The term "cutting apparatus" and/or the plural form of this term are used throughout herein to refer to any tool, device, or mechanism designed to cut through a material that includes but is not limited to wood, concrete, metal, plastic, cloth, paper, cardboard, other polymers, or a combination thereof. Examples of the cutting apparatus include but are not limited to, a chainsaw, a circular saw, a band saw, jigsaws or tiger saws, and the like.

The term "cutting element" and/or the plural form of this term are used throughout herein to refer to any object or part of an object designed to break a material upon making force-driven contact with such material. Examples of the cutting element include but are not limited to one or more protrusions, blades, ridges, notches, grooves, and the like, as well as any combination thereof. Additionally, any "cutting element" may comprise one or more "cutting surfaces" which may aid in penetrating a material with which contact is made.

The term "cutting surface" and/or the plural form of this term are used throughout herein to refer to any sharp, rough, and/or textured exterior portion of a cutting element or a portion thereof that may facilitate easier force-driven penetration of the cutting element into a material. Examples of the cutting surfaces include but are not limited to blades, edges, ridges, notches, grooves, teeth, or a combination thereof.

The term "rivet" as used herein refers, by way of non-limiting example, to any type of pin, bolt, or other fastener or fastening mechanism for holding, joining or fastening together two objects, for example, two plates of metal.

Figure 1A:
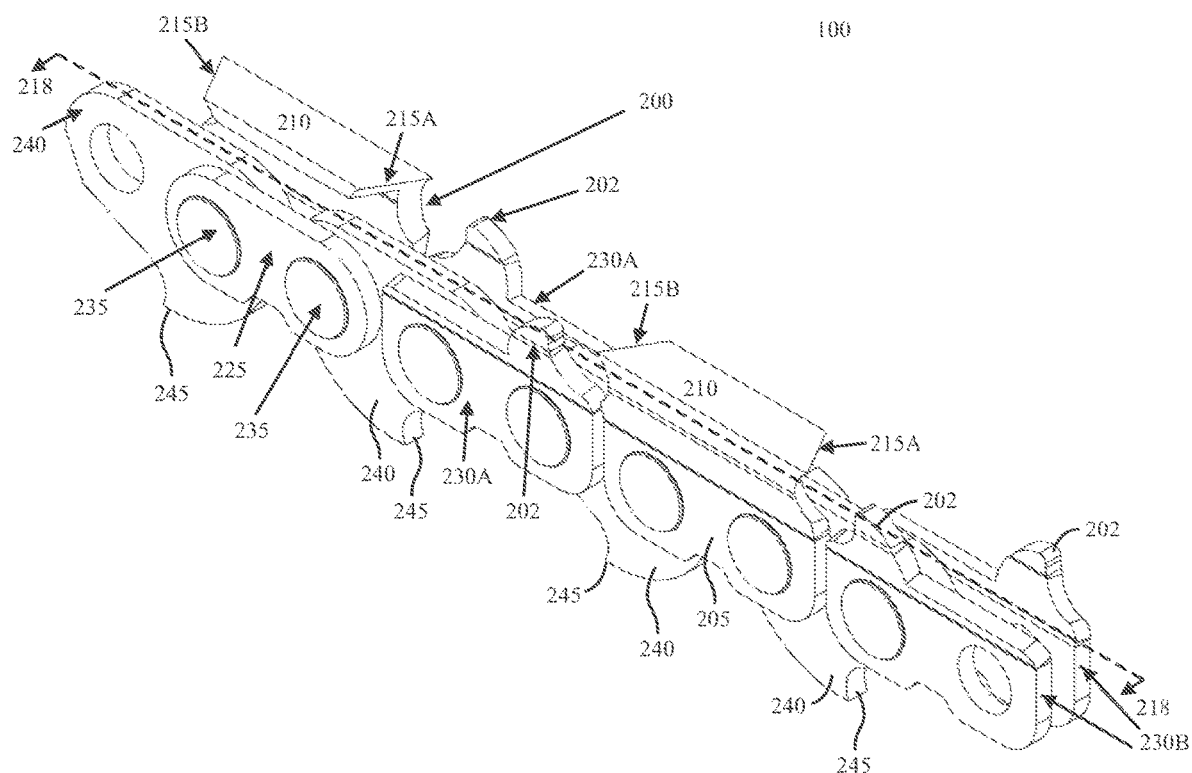
FIGS. 1A-1C shows the schematic representation of the chain concept of the cutting apparatus described herein.
Figure 1B:
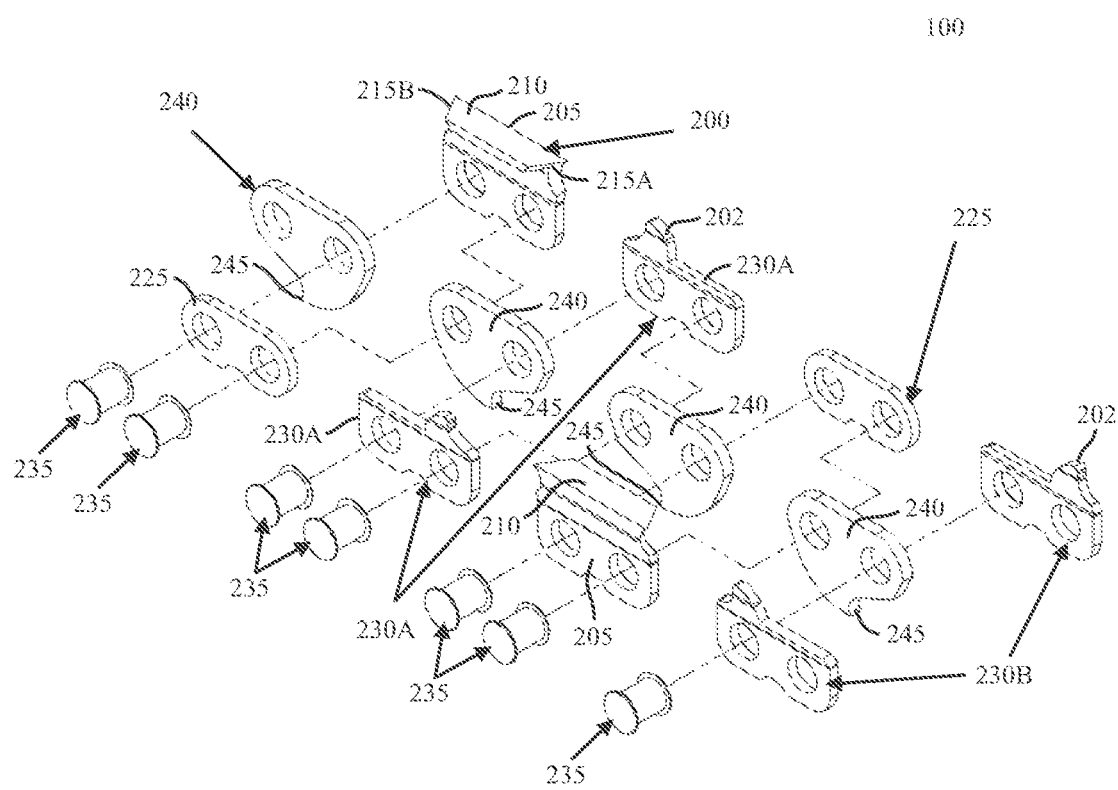
Figure 1C:
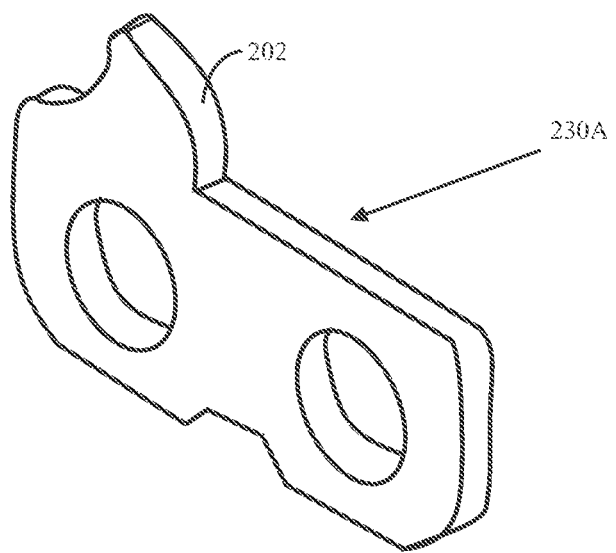

Referring now to FIGS. 1A, 1B, and 1C, a perspective view of a representative chainsaw having a chain bar and saw chain is shown.

FIG. 1A is the schematic representation of a representative cutting apparatus (#100). In this figure, the apparatus (#100) is shown to be comprised of repeating units comprised of at least one inverse "L-shaped" cutting element (#200) displaying a cutting element tooth (#210) extending toward apparatus' (#100) midline (#218) each cutting element tooth (#210) exhibiting two cutting surfaces (#215A and 215B), each cutting surface oriented in substantially opposite directions on opposing distal ends of said cutting element tooth (#210), at least one bar guide link (#240), each bar guide link exhibiting a coplanar and downward, inwardly curving tooth (#245) made to face the next adjacent curving tooth wherein downward planing teeth of two adjacent bar guides curve in opposite directions and are made to accept propulsive force (not shown) in one direction at a time, at least two rivets (#235), an elongated element (#225), and at least two anti-kickback connecting links (#230A and #230B) and at least two rivets (#235) per each unit comprising (1) a cutting element (#200), bar guide link (#240), elongated element (#225), an anti-kickback connecting link (#230A and #230B).

FIG. 1B shows the separate components of the representative cutting apparatus (#100), including bar guide link or sprocket drive link (#240), each exhibiting downward, inwardly curving tooth (#245) made to face the next adjacent curving tooth wherein downward planing teeth of two adjacent bar guides curve in opposite directions and are made to accept propulsive force (not shown) in one direction at a time, an "L-shaped" cutting element (#200), each cutting element exhibiting a cutting surface oriented in substantially opposite directions on opposing distal ends of said "L-shaped" cutting element tooth (#210), an elongated element (#225), at least two anti-kickback connecting links (230A and 230B), and at least two rivets (#235).

FIG. 1C shows representative examples of the anti-kickback connecting link #230A exhibiting raker tooth (#202) oriented toward cutting element body (#205).

Figure 1D:
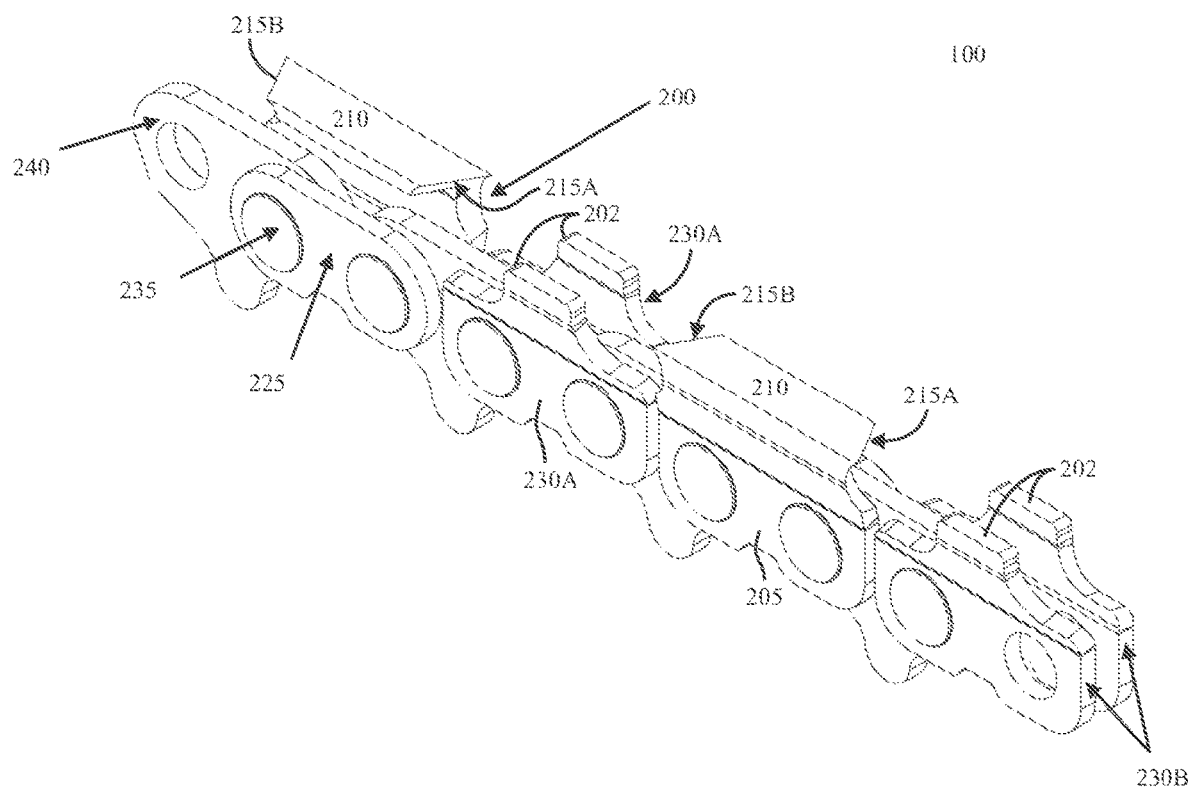
FIG. 1D shows collapsed or compressed version of the cutting apparatus with the bi-directional anti-kickback feature and the bi-directional sprocket drive link feature.

FIG. 1D shows collapsed or compressed version of the cutting apparatus with the bi-directional anti-kickback feature (#250) and the bi-directional sprocket drive link feature (#260). In this figure, the anti-kickback connecting links (#230A, #230B) are oriented to move in a bi-directional manner, i.e., anti-kickback connecting links (#230A, #230B) can move in the direction in which the cutting surface is oriented and in the direction opposite to which the cutting surface is oriented. Additionally, the bar guide link or sprocket drive links (#240) are oriented to move in a bi-directional manner and bi-directional sprocket drive link features (#260) are capable of propulsion bidirectionally.

Figure 1E:
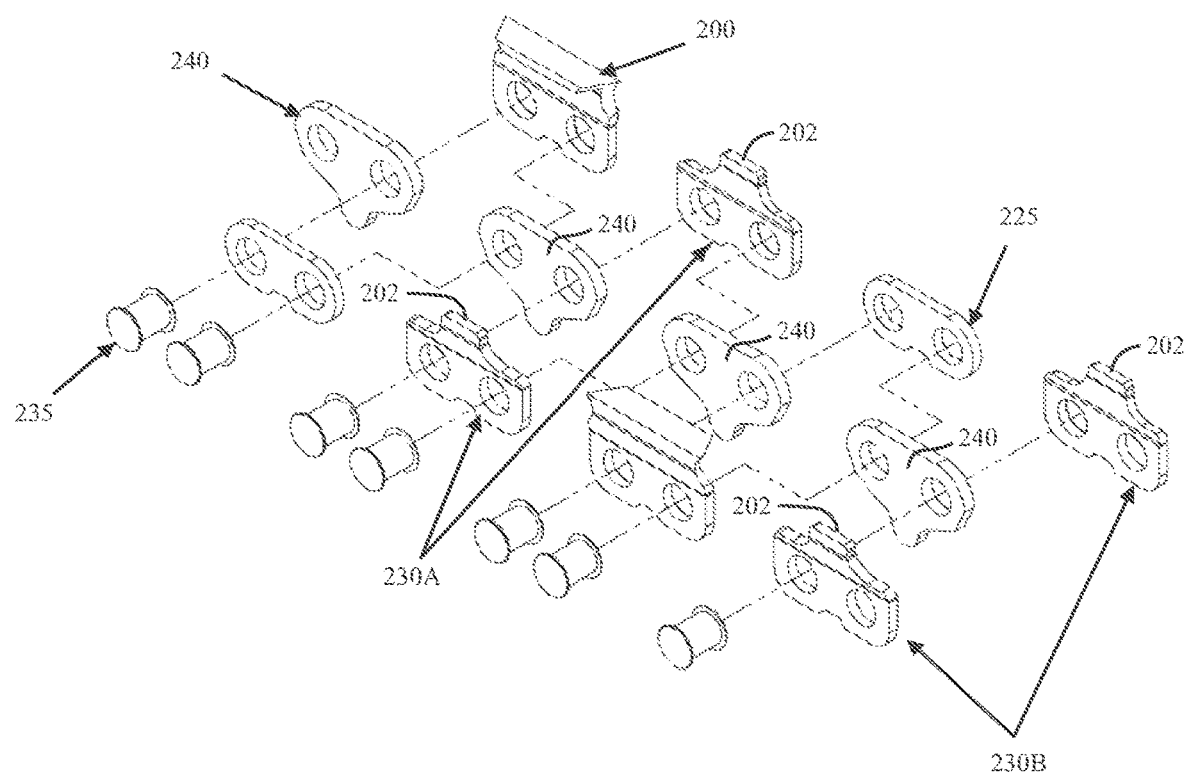
FIG. 1E shows the exploded version of the components of the cutting apparatus with the bidirectional anti-kickback feature and the bi-directional sprocket drive link feature.

FIG. 1E shows the exploded version of the components of the cutting apparatus with the bidirectional anti-kickback feature (#250) and the bi-directional sprocket drive link feature (#260). This figure shows the separate components of the representative cutting apparatus (#100) including bar guide link or sprocket drive link (#240), cutting element (#200), at least two rivets (#235), an elongated element (#225), and at least two anti-kickback connecting links (230A, 230B).

Figure 2A:
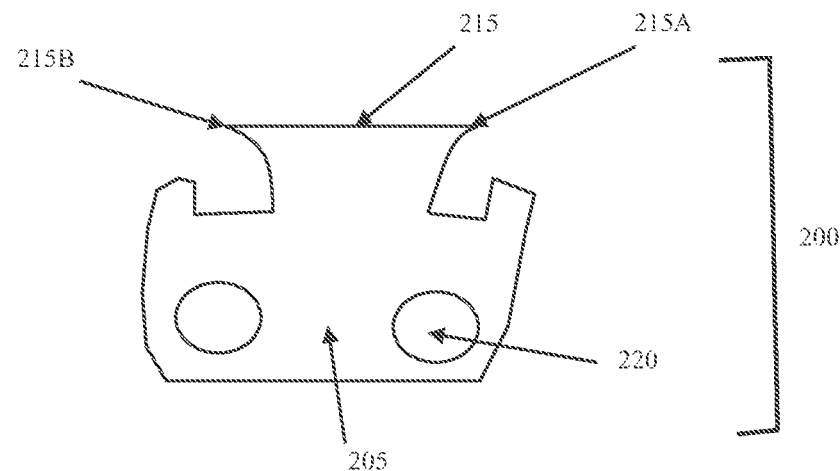
FIG. 2A shows a side view of a representative bi-directional cutting element for use with a cutting apparatus that is effective at cutting via multiple directions of movement, in accordance with the present invention.

FIG. 2A shows a side view of a representative bi-directional cutting element (#200) for use with a cutting apparatus (#100) that is effective at cutting via multiple directions of movement, in accordance with the present invention. The bi-directional cutting element (#200) may be configured as a substantially rigid object of high durability. In some embodiments, the bi-directional cutting element (#200) may comprise a cutting element body (#205) and a cutting element tooth that includes at least two cutting surfaces (#215) (shown, for example, as cutting surfaces (#215) depicted by "Edge 1" (#215A) and "Edge 2" (#215B) in FIG. 2A). Opening (#220) is also shown on the cutting element body (#205).

Figure 2B:
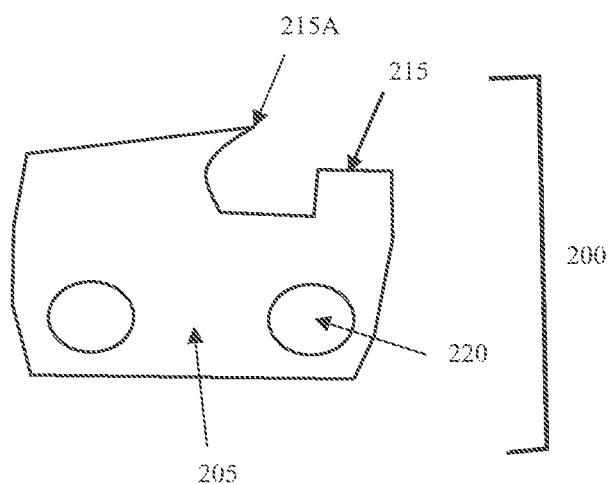
FIG. 2B shows a side view of a conventional cutting element.

FIG. 2B shows a side view of another representative bi-directional cutting element (#200) for use with a cutting apparatus (#100) that is effective at cutting via multiple directions of movement, in accordance with the present invention. FIG. 2B also shows a representative a cutting element body (#205) and cutting surfaces (#215) (showing "Edge 1" (#215A)). Opening (#220) is also shown on the cutting element body (#205).

Figure 2C:
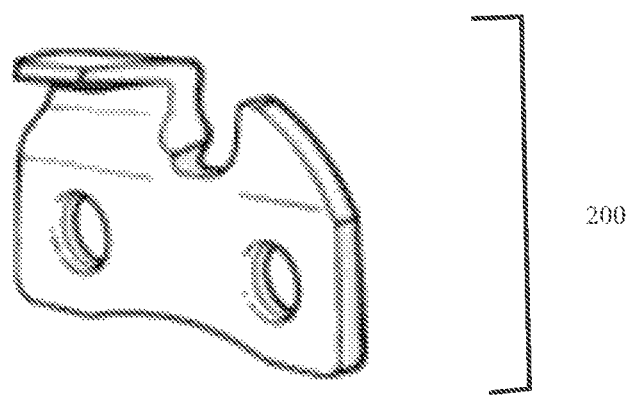
FIGS. 2C-2F show the different kinds of cutting edges and cutting elements that can be used with the cutting apparatus. For instance.
Figure 2D:
Figure 2E:
Figure 2F:
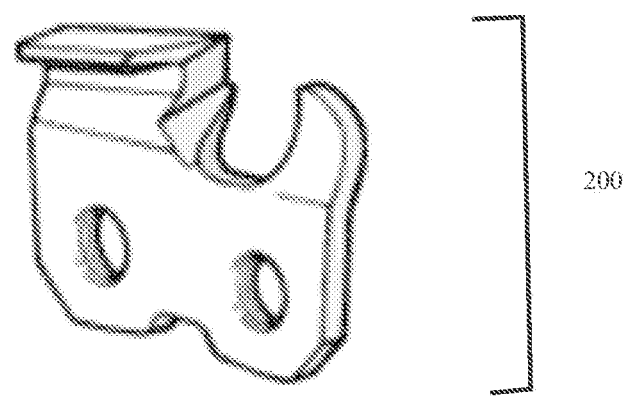

In some embodiments, the cutting surfaces (#215) may comprise a curved, or "U" shape. Cutting surfaces (#215) may take the form of blades, edges, teeth, ridges, notches, grooves, or any similar sharp and/or friction-inducing configuration as may be appreciated by those skilled in the relevant art(s) after reading the description herein. The cutting edge may comprise designs that include, but are not limited to, ⅜ inch low profile, semi-chisel, round chisel, square chisel, or a combination thereof, as shown in the different cutting elements (#200) depicted in FIGS. 2C, 2D, 2E and 2F. FIG. 2C shows a ⅜" low profile cutting element. FIG. 2D shows a semi-chisel cutting element. FIG. 2E shows a round chisel cutting element. FIG. 2F shows a square chisel cutting element.

In some embodiments, the chain saw edge may be bi-directional. Further, the edges on the cutting surface (#215) may comprise multiple angles and kerf designs as per the requirements of the user.

Additionally, in some aspects, a cutting element tooth (#210) may comprise a generally L-shaped protrusion that projects upwardly and outwardly from a cutting element body (#205) and toward the midline (#218) of the cutting apparatus (#100) as assembled. There are multiple tooth designs possible for bi-directional designs as discussed herein. In some instances, cutting surfaces (#215A and #215B) may be oriented in substantially opposite directions on opposing distal ends of a cutting element (#200), cutting element body (#205), and/or cutting element tooth (#210); however, any other appropriate number and configuration of cutting surfaces (#215A, #215B) may be integrated with a cutting element (#200) as may be apparent to those skilled in the relevant art(s) after reading the description herein.

Cutting surfaces (#215) may also be oriented such that each cutting surface (#215) assists in cutting a material when a cutting element (#200) is moved in the direction that a given cutting surface (#215) is oriented. Materials that may be cut by a cutting element (#200) may include, but are not limited to wood, concrete, metal, plastic, cloth, paper, cardboard, other polymers, or a combination thereof.

In some embodiments, a cutting element (#200) may further comprise at least one raker tooth (#202) that converges distally from a cutting element body at a sharp tip end. A raker tooth (#202) may serve to control the depth of the cut that a cutting element is penetrating and/or to remove loose chips and/or debris from the kerf during cutting to allow a cutting element to function more efficiently and/or effectively. Raker teeth may be positioned before or after cutting element teeth. The raker teeth may be oriented in one direction or may be bi-directional just like the cutting surface (#215).

Figures 3A, 3B:
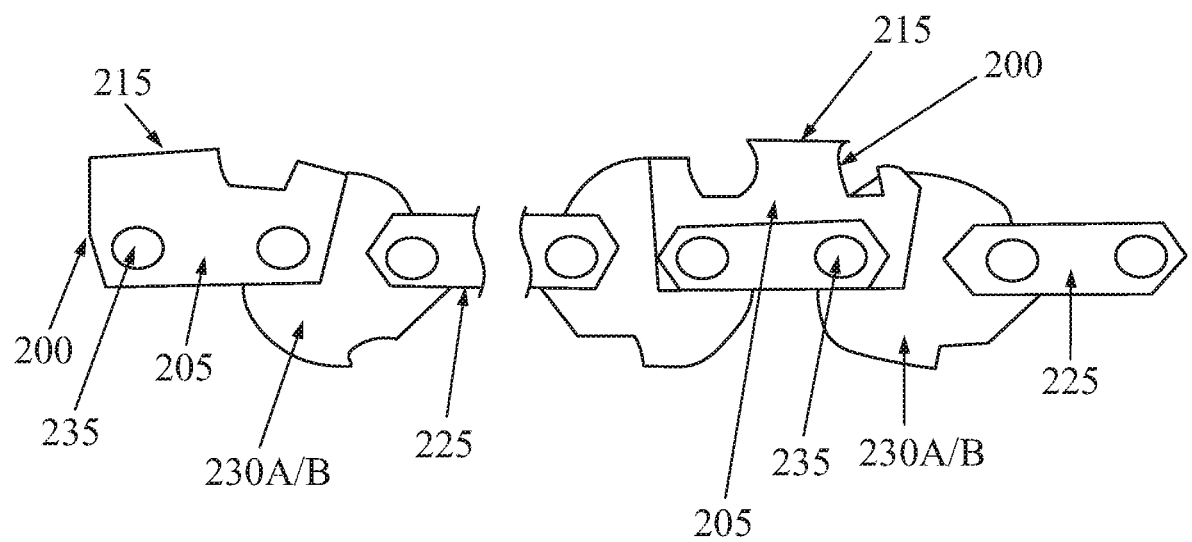
FIG. 3A shows a side view of a conventional section of a chainsaw chain.
FIG. 3B shows a side view of a double cutting link section according to the present invention.

Additionally, a cutting element (#200) may include at least one opening (#220) capable of receiving a connecting mechanism that allows the cutting element (#200) to be movably attached to other cutting elements as shown in FIGS. 3A and 3B.

Examples of a cutting element (#200) include but are not limited to any appropriate material of reasonable strength designed to cut though substances of varying durability, such appropriate material including but not limited to metals, such as steel, and other polymers. In some embodiments, the cutting element body (#205) and cutting surfaces (#215) may comprise different materials for any variety of reasons, including but not limited to maximizing the effectiveness of a cutting element and/or minimizing the cost of production of a cutting element.

In some embodiments, the cutting element tooth (#210) may comprise steel as well as carbide cutting edge inserts.

FIG. 2A shows a side view of a representative bi-directional cutting element (#200) for use with a cutting apparatus (#100) that is effective at cutting via multiple directions of movement, in accordance with the present invention. One or more cutting elements (#200) may be attached to an elongated element (#225) for use with a cutting apparatus (#100) that is effective at cutting via multiple directions of movement as shown in FIG. 3A. An elongated element (#225) may be a flexible member capable of securely retaining at least one cutting element. An elongated element (#225) may comprise a plurality of connecting mechanisms used to securely attach a plurality of cutting elements (#200) to the elongated element (#225) via one or more openings (#220) on the cutting elements (#200). Examples of connecting mechanisms include, but are not limited to, pins, rivets (#235), screws, nails, bolts, or any other similar component as will be recognized by those skilled in the relevant art(s) after reading the description herein. In a preferred embodiment, connecting mechanisms may moveably attach cutting elements (#200) to link arms via holes or openings (#220) on generally opposing distal ends of link arms. In some embodiments, link arms may be generally planar elongated components that interconnect the plurality of cutting elements (#200) via connecting mechanisms in a series in order to form a chain, such as, by way of example and not limitation, a chain used with a chainsaw. In such embodiments, an elongated element (#225) may further comprise a plurality of sprocket drive links. In some embodiments, cutting elements may comprise a series with sprocket drive links wherein the series is interconnected by a plurality of link arms. In some embodiments, the series may comprise an alternating sequence of cutting elements (#200) and sprocket drive links.

Sprocket drive links may interact with a sprocket within the chainsaw to move an elongated element (#225) in a substantially revolving motion within a slot, channel, or groove along the outer perimeter of the chainsaw bar as will be appreciated by those skilled in the relevant art(s) after reading the description herein. The sprocket may be driven by a shaft connected to a power source, such as an internal combustion engine or an electrical motor. In some embodiments, the power source may include some form of human applied force. By way of example and not limitation, an engine used with the chainsaw may comprise a two-stroke, air-cooled engine.

Although elongated element (#225) may move from left to right, it is important to note that due to the multiple cutting surfaces (#215A, #215B) on a cutting element tooth (#210), cutting element body (#205), and/or a cutting element (#200), an elongated element (#225) may cut a material just as effectively when the elongated element (#225) is moving from right to left. In embodiments, wherein an elongated element (#225) is used with a cutting apparatus that is in the form of a chainsaw, the direction of travel or movement for the elongated element (#225) may be changed by changing the operational direction provided by the chainsaw power source, thereby changing the direction of applied force to the cutting element(s).

In embodiments, wherein the chainsaw motor is an internal combustion engine, the drive direction may be adjusted by a clutch or gear change mechanism. Alternatively, in embodiments wherein the chainsaw motor is electric, a toggle switch or similar device may change the motor's direction of operation. In some additional embodiments, the direction of travel for an elongated element (#225) may be changed by removing the elongated element (#225) from the cutting apparatus (#100) and manually changing its orientation by reinstalling it upon the cutting apparatus (#100) in a different orientation, such as in the opposite orientation. To facilitate this reversal, adjacent sprocket drive links may be configured with their tips or fingers facing one another so that every other sprocket drive link is engaged by the sprocket. Thus, one set of alternating sprocket drive links may function to move an elongated member in a first cutting direction and the other set of alternating sprocket drive links may function to move an elongated member in a second cutting direction when the orientation of the elongated member is reversed. Additionally, sprocket drive links may also function to clean dust and/or debris from the chainsaw bar slot/channel/groove wherein sprocket drive links operate.

Regardless of configuration, when an elongated element (#225) is moving or traveling in one direction, only cutting surfaces (#215) that are oriented in that direction get used and worn. Thus, when those cutting surfaces (#215) get damaged and/or wear out, there is at least a second set of cutting surfaces (#215) that may be utilized by changing the travel direction of the elongated element (#225), thereby at least doubling the useful life of the elongated element (#225). Additionally, an elongated element (#225) is relatively simple to install in that there is less of a chance of installing it in the "wrong" orientation since it is capable of effectively cutting in multiple directions.

Figure 4:
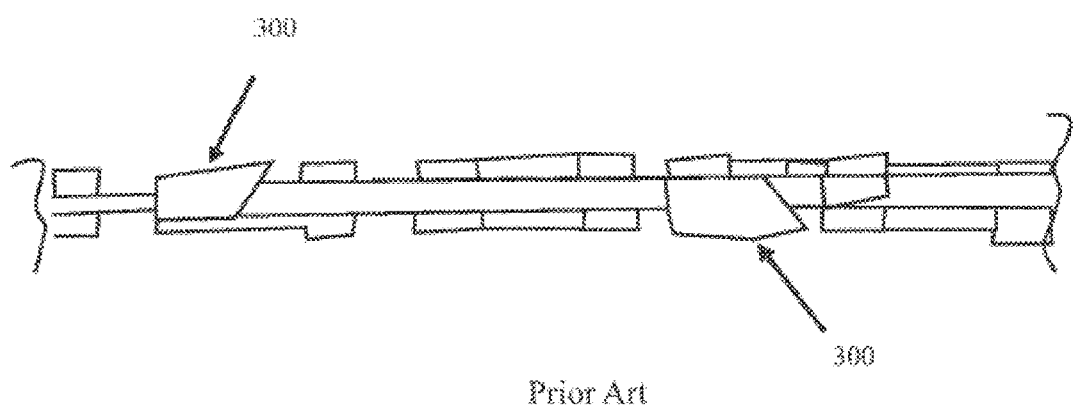
FIG. 4 shows a top view of a traditional, conventional link with forward facing cutting links arranged on opposite sides of a chain.

FIG. 4 shows a top view of a traditional, conventional link with forward facing cutting links (#300) arranged on opposite sides of a chain.

Figure 5:
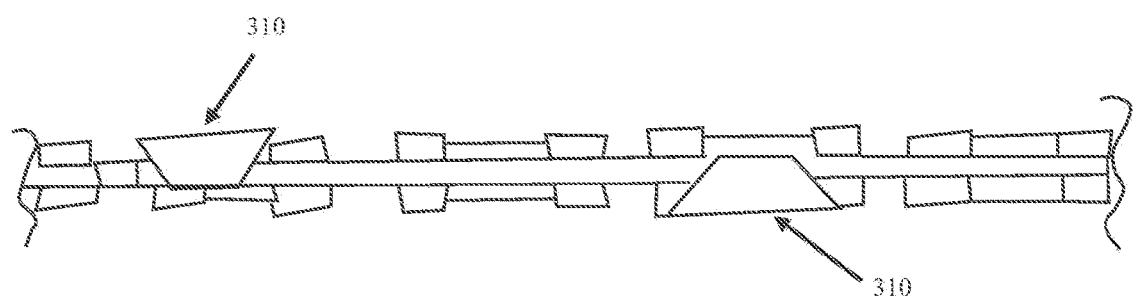
FIG. 5 shows a top view of an individual bi-directional cutting link section, in accordance with the present invention, the orientation depending on the intended cutting direction.
Figure 6A:
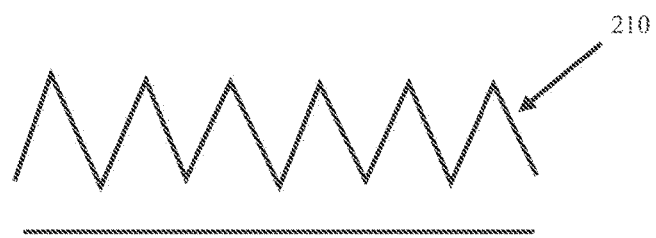
FIGS. 6A, 6B, 6C, 6D, 6E, and 6F show perspective views of representative crosscut saw tooth designs.
Figure 6B:
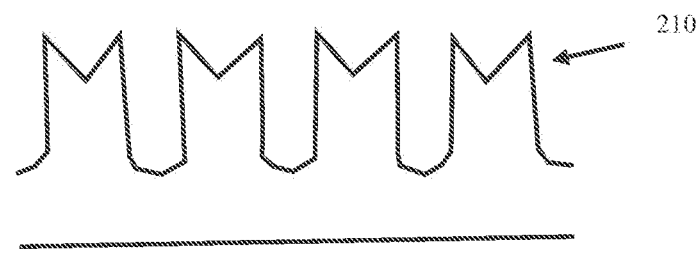
Figure 6C:
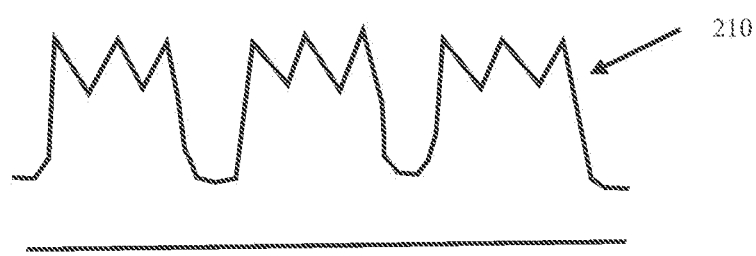
Figure 6D:
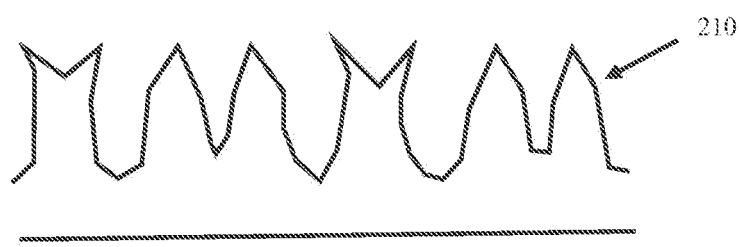
Figure 6E:
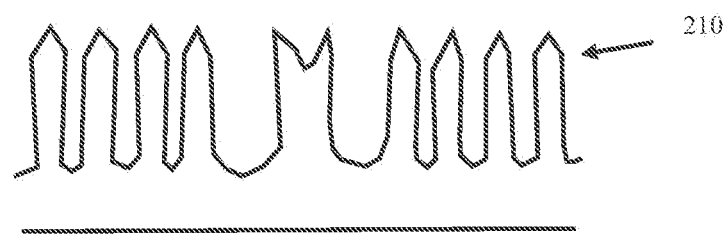
Figure 6F:
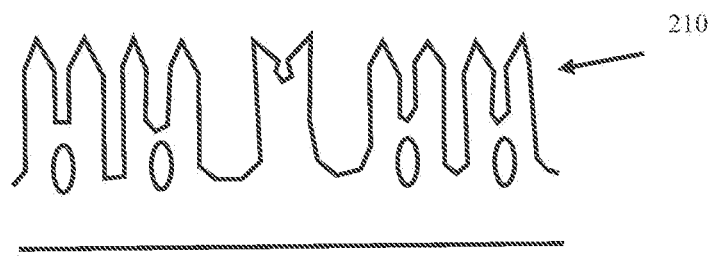

FIG. 5 shows a top view of an individual bi-directional cutting link section, in accordance with the present invention, with bi-directional cutting links (#310) the orientation depending on the intended cutting direction.

By way of non-limiting example, FIGS. 6A, 6B, 6C, 6D, 6E and 6F show perspective views of representative crosscut saw tooth designs that can be used in accordance with the present invention. By way of non-limiting example, a cutting element tooth (#210) may have any one of the representative tooth designs depicted in FIGS. 6A, 6B, 6C, 6D, 6E and 6F.

Figure 7:
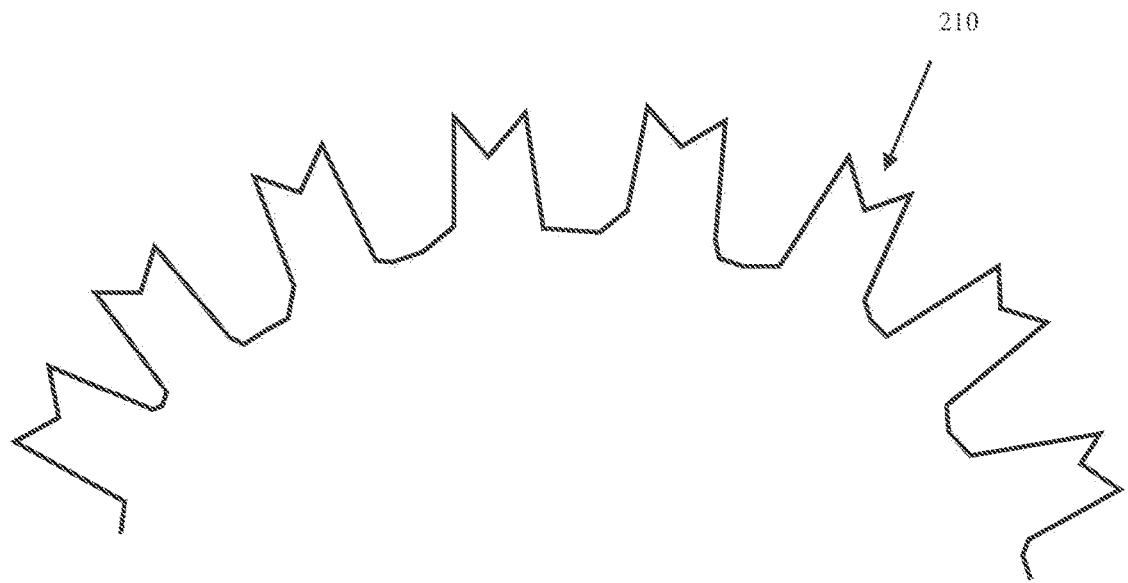
FIG. 7 shows a side view of a section of a bi-directional cutting surface of a representative M tooth pattern in a circular saw design, in accordance with the present invention.

FIG. 7 shows a side view of a section of a bi-directional cutting surface with a representative M tooth (#210) pattern in a circular saw design, in accordance with one embodiment of the present invention.

Figure 8:
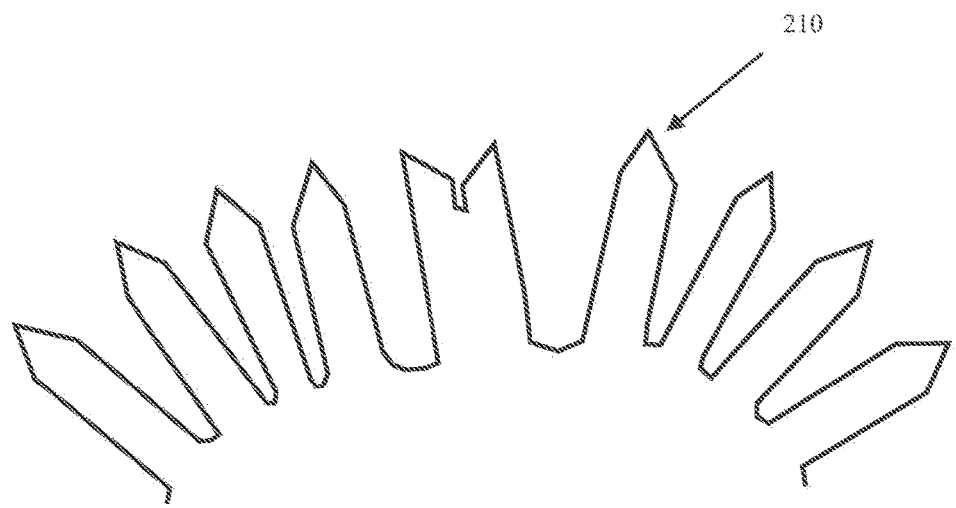
FIG. 8 shows a side view of a section of a bi-directional cutting surface of a representative lance tooth pattern in a circular saw design, in accordance with the present invention.

FIG. 8 shows a side view of a section of a bi-directional cutting surface with a representative lance tooth (#210) pattern in a circular saw design, in accordance with one embodiment of the present invention.

Figure 9:
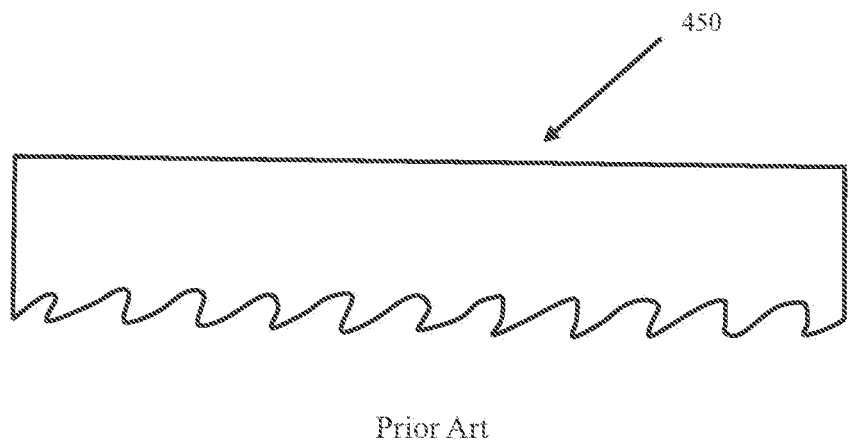
FIG. 9 shows a side view depicting a traditional cutting section of a band saw blade with forward facing cutting teeth arranged on one side of the band.

FIG. 9 shows a side view depicting a traditional cutting section of a "one side cutting teeth" band saw blade (#450) with forward facing cutting teeth arranged on one side of the band.

Figure 10:
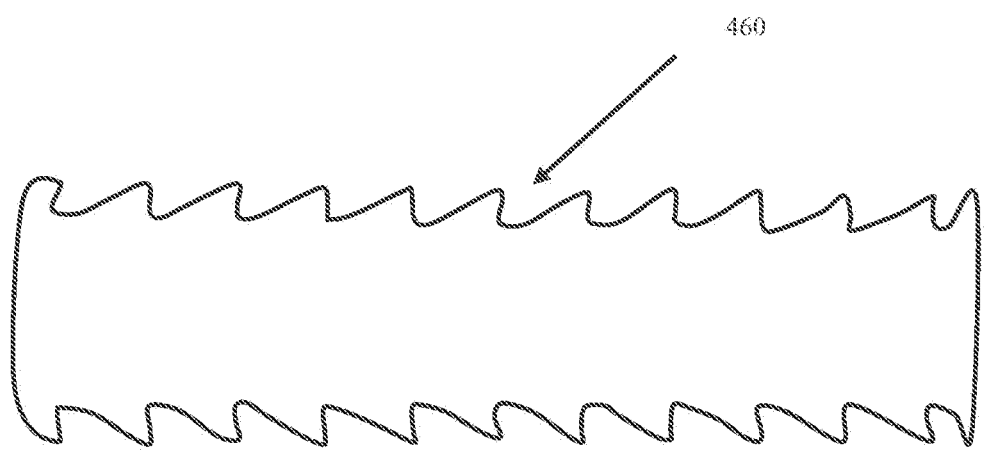
FIG. 10 shows a side view depicting a representative bi-directional cutting section of a band saw blade with forward facing cutting teeth arranged on opposite sides of the band, in accordance with the present invention.

FIG. 10 shows a side view depicting a representative bi-directional cutting section of a "two side cutting teeth" band saw blade (#460) with forward facing cutting teeth arranged on opposite sides of the band, in accordance with the present invention.

Figure 11:
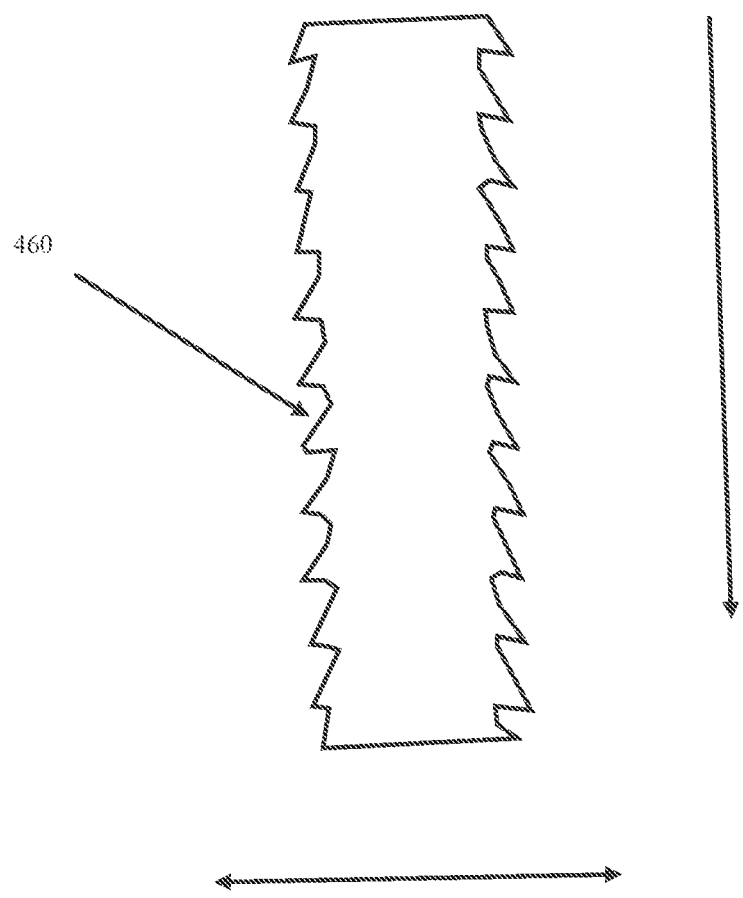
FIG. 11 shows a new representative bidirectional design for a band saw blade with the cutting teeth oriented in the direction of travel of the blade to enable the workpiece to travel in a forward and reverse cutting direction. in accordance with the present invention.

FIG. 11 shows a new representative bidirectional design for a "two side cutting teeth" band saw blade (#460) with the cutting teeth oriented in the direction of travel of the blade to enable the workpiece to travel in a forward and reverse cutting direction, in accordance with the present invention.

Figure 12:
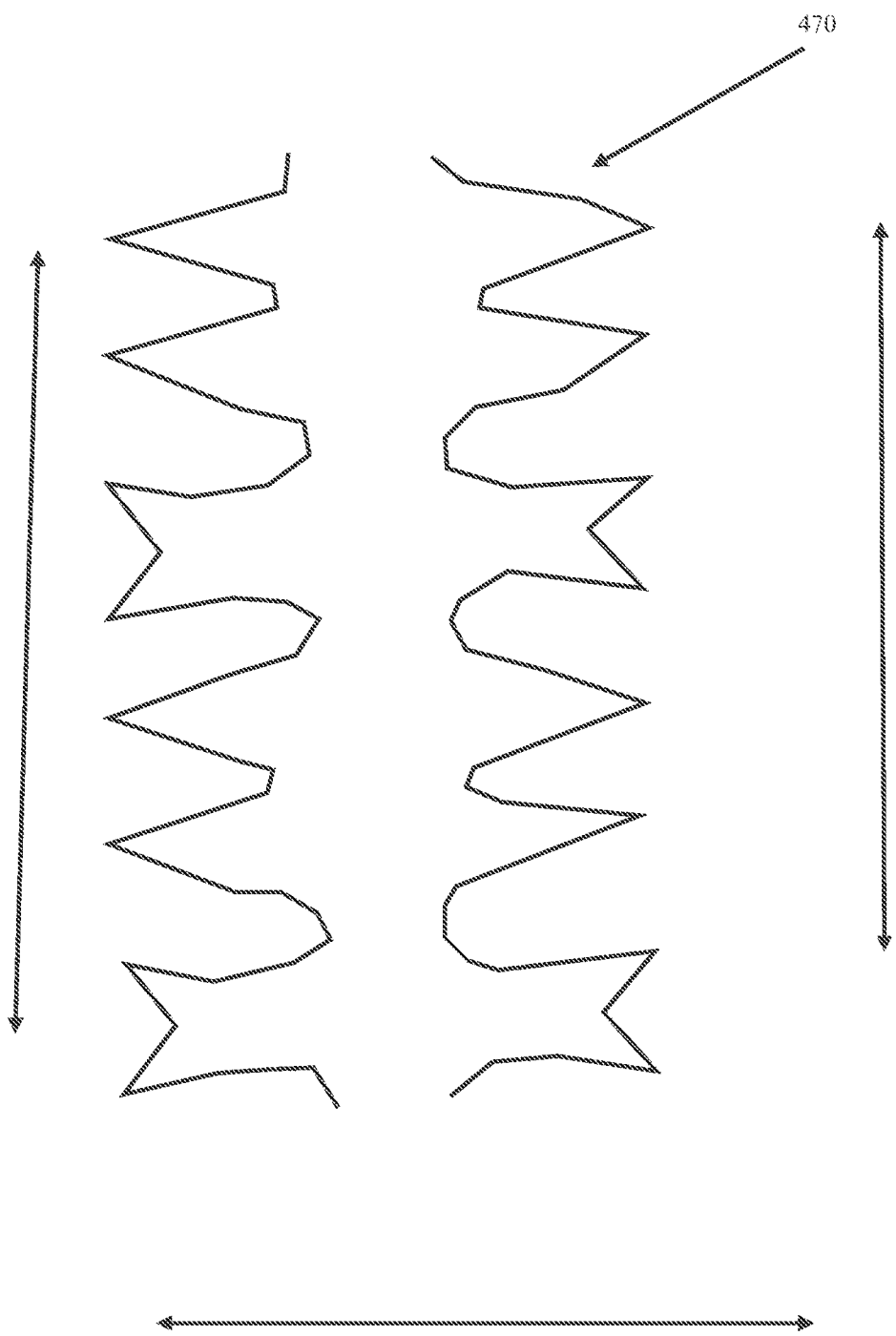
FIG. 12 shows a new representative bidirectional design for a band saw blade with the cutting teeth oriented in the direction of travel of the blade to enable the workpiece to travel in a forward and reverse cutting direction. The illustrated champion cutting tooth pattern also allows for the blade direction to be reversed in an upward cutting motion allowing for bidirectional cutting as well as motor reversal capabilities, in accordance with the present invention. This design allows for up to 4 distinct cutting directions.

FIG. 12 shows a new representative bidirectional design for a "champion cutting tooth pattern" band saw blade (#470) with the cutting teeth oriented in the direction of travel of the blade to enable the workpiece to travel in a forward and reverse cutting direction. The illustrated champion cutting tooth pattern also allows for the blade direction to be reversed in an upward cutting motion allowing for bidirectional cutting as well as motor reversal capabilities, in accordance with the present invention. This design allows for up to 4 distinct cutting directions.

Link arms and sprocket drive links may comprise any appropriate materials as will be appreciated by those skilled in the relevant art(s) after reading the description herein, including but not limited to metals, such as steel, and other durable polymers. Additionally, as will be apparent to those skilled in the relevant art(s) after reading the description herein, an elongated element (#225) may comprise a variety of lengths, pitches, and gauges, as well as anti-kickback features. Examples of various pitches include but are not limited to about 0.2500 inches and 0.3750 inches, while various gauges may include but are not limited to about 0.0434", 0.050", 0.058", and 0.063".

In some embodiments, the top portion of each cutting element, such as a cutting element tooth, may face upwardly away from the chainsaw bar and may comprise one or more protruding flanged teeth, with each flanged tooth comprising at least two cutting surfaces. Each flanged tooth may be oriented toward the center portion of an elongated element (#225). In some embodiments, adjacent cutting elements may be on opposing lateral portions of an elongated element (#225) so that the protruding flanged teeth of such adjacent cutting elements face one another. In some additional embodiments, cutting elements on opposing lateral portions of elongated element (#225) are not adjacent.

In other embodiments, a circular cutting blade for use with a cutting apparatus is effective at cutting via multiple directions of movement.

In some embodiments, the cutting apparatus described herein may include an apparatus other than a chainsaw. One such alternative embodiment may include but is not limited to a circular saw, such as a circular saw that utilizes a circular cutting blade. A circular cutting blade may comprise, for example, a substantially circular body with a plurality of cutting elements protruding radially therefrom. Examples of cutting elements include but are not limited to blades, edges, teeth, ridges, notches, grooves, or any similar configuration as may be appreciated by those skilled in the relevant art(s) after reading the description herein. In regards to a cutting blade, as described elsewhere herein, cutting elements may comprise "M tooth" protrusions that are generally shaped like the letter "M," with two distal peaks separated by a V-shaped groove.

In some alternative aspects, as described elsewhere herein, cutting elements may comprise "lance tooth" protrusions. Such cutting elements may extend radially outward from a substantially circular body of a circular cutting blade. Lance tooth cutting elements may have elongated shafts that terminate at a sharp point distally from a circular cutting blade. Each one of the cutting elements and may comprise at least two cutting surfaces. Such cutting surfaces may include but are not limited to blades, edges, teeth, ridges, notches, grooves, or any similar sharp and/or friction-inducing configuration as may be appreciated by those skilled in the relevant art(s) after reading the description herein. In some embodiments, cutting elements may comprise pairs of cutting surfaces, oriented in substantially opposite directions.

In certain embodiments, a cutting apparatus in accordance with the present disclosure may take the form of circular saws that utilize any circular cutting blade as may be apparent to those skilled in the relevant art(s) after reading the description herein. In some embodiments, the circular saw may have bi-directional design. Examples of circular cutting blades include but are not limited to those with plain tooth, champion tooth, Great American tooth, perforated lance tooth, or any other tooth patterns as will be recognized by those skilled in the relevant art(s) after reading the description here that have cutting elements with multiple cutting surfaces capable of cutting effectively via at least two different directions of movement, such as two generally opposing directions of rotation. Such circular cutting blades in accordance with the present disclosure may be utilized by circular saws that may or may not include a power source to provide a rotational direction of force. Examples of the power source may include but are not limited to an internal combustion engine, an electrical motor, human applied force, or any kind of other power source. In some embodiments, adjacent sequential cutting elements associated with the circular cutting blades are positioned on opposing lateral sides of the blade and extend upwardly therefrom.

In order to utilize the multiple cutting surfaces of the circular saw blades, in accordance with the present invention, such as when the cutting surfaces oriented in one direction wear out or get damaged, the circular saw may be configured to rotate the circular cutting blade in two different directions of rotation, wherein the direction of rotation may be altered via a toggle switch or other appropriate mechanism as may be apparent to those skilled in the relevant art(s) after reading the description herein.

In additional embodiments, the circular saw blade may be removed, flipped 180 degrees about a vertical axis, and reinstalled and operated in the same direction of rotation in order to utilize different cutting surfaces associated with the cutting elements, such as, by way of example and not limitation, those that may be facing in a generally opposite direction.

In other embodiments, a linear cutting blade may be used with a cutting apparatus that is effective at cutting via multiple directions of movement.

In certain embodiments, a cutting apparatus as described herein may be configured as a band saw, such as a band saw utilizing a linear cutting blade. A linear cutting blade may comprise an elongated planar body that terminates in two opposing side edges. In accordance with the present invention, a plurality of cutting elements may protrude outwardly from both edges, thus enabling the band saw to cut a material using both sides of a linear cutting blade. Cutting elements may include but are not limited to teeth, ridges, notches, grooves, or any similar configuration or a combination thereof as may be appreciated by those skilled in the relevant art(s) after reading the description herein. Additionally, each cutting element may comprise at least one cutting surface. Cutting surfaces may comprise blades, edges, teeth, ridges, notches, grooves, or any similar sharp and/or friction-inducing configuration as may be appreciated by those skilled in the relevant art(s) after reading the description herein.

In certain embodiments, cutting elements each contain a single cutting surface, with all cutting surfaces being oriented in the same direction. In additional embodiments, each cutting element may comprise at least two cutting surfaces which may include but is not limited to being oriented in substantially opposite directions, so as to allow a linear cutting blade to cut by moving in at least two different directions of movement. In certain embodiments, a linear cutting blade may oscillate from one direction to another. Other effective configurations of and quantities of cutting surfaces upon cutting elements may be utilized as may be apparent to those skilled in the relevant art(s) upon reading the description herein.

In other embodiments of the present invention, band saws utilizing a linear cutting blade may comprise a power source to provide a direction of force. Examples of the power source include but are not limited to an internal combustion engine, an electrical motor, human applied force, or any other kind of power source.

In some embodiments, the chainsaws, bandsaws, circular saws, and jigsaws or tiger saws, whether it is a handheld portable device or stationary, may comprise an electrical switch of any size, voltage and/or phases, a mechanical clutch that operates on gasoline or diesel motors or a combination thereof to reverse the direction of the motor.

In another embodiment, the bandsaws and jigsaws may have bi-directional design, and forward and reverse workpiece for a total of four directional cutting adaptations, for instance, up, down, forward and reverse.

While various aspects of the present invention have been described herein, it should be understood that they have been presented by way of example and not limitation. It will be apparent to persons skilled in the relevant art(s) that various changes in form and detail can be made therein without departing from the spirit and scope of the present disclosure. In addition, it should be understood that the figures are presented to depict only certain embodiments. The present invention may be implemented in ways other than that shown in the accompanying figures (e.g., utilization with different cutting apparatus; utilization of different power sources and devices other than those mentioned herein).

What is claimed is:

1. A cutting apparatus, comprising:
  a plurality of cutting elements, a plurality of anti-kickback connecting links, a plurality of elongated elements, a plurality of bar guide links, and a plurality of rivets;
  said cutting apparatus comprised of a continuous repeating series of cutting elements of said plurality of cutting elements, anti-kickback connecting links of said plurality of anti-kickback links and elongated elements of said plurality of elongated elements forming a first chain side connected to an offset and opposing continuous repeating series of cutting elements of said plurality of cutting elements, anti-kickback connecting links of said plurality of anti-kickback links and elongated elements of said plurality of elongated elements forming a second chain side via said plurality of bar guide links and said plurality of rivets;
  said plurality of bar guide links positioned between the first chain side and the second chain side forming a plurality of points of first and second chain side attachment set on an apparatus midline;
  each of said anti-kickback links of the plurality of anti-kickback links on said first chain side and second chain side positioned across from a corresponding anti-kickback link of the opposite chain side, and said cutting elements being alternating and offset from corresponding cutting elements of the opposite chain side;
  each cutting element of the plurality of cutting elements includes a cutting element body comprising an inverse L-shaped protrusion projecting upwardly and outwardly from the cutting element body forming a cutting element tooth oriented inward toward said apparatus midline;
  each inverse L-shaped protrusion including a main body portion projecting upwardly from a corresponding cutting element body and a horizontal protrusion projecting therefrom forming the cutting element tooth;
  each cutting element tooth including two cutting element tooth surfaces on each inverse L-shaped protrusion;
    a first cutting element tooth surface of the two cutting element tooth surfaces forming a first cutting edge oriented in a first direction, and a second cutting element tooth surface of the two cutting element tooth surfaces forming a second cutting edge oriented in a second, opposite, direction thereby allowing the cutting apparatus to penetrate a substance via moving in said first direction or said second direction;

said each of said plurality of anti-kickback connecting links positioned adjacent to said adjacent cutting element on the same chain side of said cutting apparatus;

said each of said anti-kickback connecting links having a raised, upwardly planing tooth including an outer curved surface planing gradually upward toward said adjacent cutting element corresponding to first or second chain side;

the raised, upwardly planing teeth configured to control depth of the cut of a given cutting element penetrating into the material being cut;

each of said plurality of elongated elements positioned across the apparatus midline from a corresponding cutting element on the opposite chain side;

a first side chain and a second side chain wherein each of said plurality of bar guide links include a coplanar, downward planing tooth for cutting apparatus propulsion in either of the first direction and the second direction; and said plurality of rivets joining each bar guide link, cutting element, anti-kickback connecting links and elongated element to one another at the plurality of contact points.

2. The cutting apparatus of claim 1, wherein:

said each bar guide link of the plurality of bar guide links allows for attachment of said chain sides wherein said anti-kickback connecting links are adjacent to said cutting elements on each of the first and second chain sides;

each said anti-kickback connecting link on one chain side being arranged across the apparatus midline from a corresponding anti-kickback connecting link; and said centrally disposed bar guide links exhibiting said coplanar, downward curving tooth made to face the next adjacent curving tooth wherein downward planing teeth of two adjacent bar guide links curve in opposite directions and are made to accept propulsive force in said first and second directions.

3. The cutting apparatus of claim 2, wherein said each upwardly planing tooth of said each anti-kickback connecting link includes the outer curved surface oriented toward the next adjacent cutting element; and whereby work product is guided into said cutting element tooth via following said curved surface.

4. The cutting apparatus of claim 3, wherein at least one of the plurality of said bar guide links moves in the same direction in which one said cutting element tooth surface is oriented and at least one bar guide link of the plurality of said bar guide links moves in a direction opposite to the orientation of the one said cutting element tooth surface.

5. The cutting apparatus of claim 2, wherein said cutting apparatus is removable from a cutting apparatus guide bar and is configured to be reinstalled in a second, opposite orientation to engage one of two said cutting element tooth surfaces with the material being cut in said first or second direction.

6. The cutting apparatus of claim 2, wherein said cutting apparatus alternates between a first and second revolving direction by rotating said cutting apparatus in one of two directions by applying force on said bar guide links in said one of two directions and reversing the direction by applying force to said downward planing teeth in the opposite direction thereby reversing the direction of the cutting apparatus.

7. The cutting apparatus of claim 1, wherein said cutting element comprises each of the two cutting element tooth surfaces converging distally from said cutting element body, wherein the two cutting element tooth surfaces face in opposite directions.

8. The cutting apparatus of claim 1, wherein said each cutting element body comprises at least one opening, wherein said opening allows said each cutting element to be movably attached to another said cutting element, via at least one of said rivets, said anti-kickback links, said bar guide link, directly or indirectly, by said elongated element.

9. The cutting apparatus of claim 1, wherein the cutting element tooth surface is flat wherein said cutting surface is a blade, edge, or tooth.

10. The cutting apparatus of claim 1, wherein said cutting element tooth faces inward toward the interior of the apparatus midline at a most distal end of said inverse L-shaped protrusion.

11. The cutting apparatus of claim 10, wherein said two cutting element tooth surfaces are oriented in substantially opposite directions on opposing ends of the cutting element tooth.

12. The cutting apparatus of claim 1, wherein the cutting apparatus is configured to be propelled by an internal combustion engine, an electrical motor, or a human applied force where the cutting apparatus is configured to rotate in said first direction or said second direction, wherein the cutting apparatus is configured to be removable and reinstalled in a second orientation and is configured to be removable and installable to move, in an opposite direction, in said second direction or said first direction by changing a motor's direction of operation.

13. The cutting apparatus of claim 1, wherein the cutting apparatus is configured as a chain for use with a chainsaw.

14. The cutting apparatus of claim 1, wherein said cutting apparatus comprises said plurality of cutting elements, wherein each cutting element includes said cutting element tooth comprising one of said two cutting element tooth surfaces oriented in said first direction so as to be engaged when the cutting apparatus moves in a first cutting direction and against a material to be cut; and wherein the second cutting element tooth surface of each cutting element is oriented in said second, opposite direction so as to be engaged when the cutting apparatus moves in a second cutting direction and against a material to be cut.

15. The cutting apparatus of claim 1, wherein said bar guide links exhibit downward, rounded protrusions; and said one anti-kickback connecting link moving in a first direction in which one cutting surface is oriented to move and wherein said one anti-kickback connecting link moves in a second, opposite, direction wherein said opposite facing cutting surface is oriented to move.

16. The cutting apparatus of claim 1, wherein said plurality of cutting elements, said plurality of anti-kickback connecting links, said plurality of elongated elements, and said plurality of bar guide links are connected by said rivets, pins, bolts or other fasteners or fastening mechanisms, or a combination thereof, for holding, joining or connecting cutting element components.

* * * * *